US011732960B2

(12) United States Patent
Ryu et al.

(10) Patent No.: US 11,732,960 B2
(45) Date of Patent: Aug. 22, 2023

(54) REFRIGERATOR APPLIANCE HAVING A WEIGHT-DETECTING SHELF ASSEMBLY

(71) Applicant: Haier US Appliance Solutions, Inc., Wilmington, DE (US)

(72) Inventors: Choon Jae Ryu, Prospect, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 255 days.

(21) Appl. No.: 17/173,319

(22) Filed: Feb. 11, 2021

(65) Prior Publication Data
US 2022/0252337 A1 Aug. 11, 2022

(51) Int. Cl.
F25D 29/00 (2006.01)
F25D 25/02 (2006.01)
G01G 19/52 (2006.01)

(52) U.S. Cl.
CPC .......... *F25D 29/005* (2013.01); *F25D 25/02* (2013.01); *G01G 19/52* (2013.01); *F25D 2700/06* (2013.01)

(58) Field of Classification Search
CPC .............. F25D 25/02; F25D 2400/361; F25D 2700/06; F25D 29/005; F25D 2500/06; G01G 5/003; G01G 5/006; G01G 5/04; G01G 19/52; A47B 96/021; A47F 5/0043
See application file for complete search history.

(56) References Cited

U.S. PATENT DOCUMENTS

| 4,791,411 A * | 12/1988 | Staar .................... G06Q 10/087 340/568.1 |
| --- | --- | --- |
| 9,989,298 B1 * | 6/2018 | Wantland ................ A47B 57/42 |
| 10,121,121 B1 * | 11/2018 | De Bonet .............. A47B 57/34 |
| 10,591,348 B1 * | 3/2020 | Shi ......................... A47F 3/0408 |
| 10,614,415 B1 | 4/2020 | De Bonet |
| 10,732,026 B1 * | 8/2020 | Danenberg ........... H01R 13/514 |
| 10,746,589 B1 * | 8/2020 | Danenberg ............... H05K 7/14 |
| 10,809,122 B1 * | 10/2020 | Danenberg .............. A47F 5/103 |
| 11,306,966 B2 * | 4/2022 | Schroeder ............... F25D 25/02 |
| 2003/0131541 A1 * | 7/2003 | Lee ....................... F25D 17/065 52/79.1 |
| 2009/0255292 A1 * | 10/2009 | Benz ...................... A47B 57/06 700/275 |
| 2013/0242561 A1 * | 9/2013 | Kramer ................ H01R 25/142 439/577 |
| 2013/0257253 A1 * | 10/2013 | Haltmeyer ............ F25D 25/025 312/404 |

(Continued)

FOREIGN PATENT DOCUMENTS

JP 2019070478 A 5/2019
KR 20140127590 11/2014

*Primary Examiner* — Hiwot E Tefera
(74) *Attorney, Agent, or Firm* — Dority & Manning, P.A.

(57) ABSTRACT

A refrigerator appliance may include a cabinet, a door, and a shelf assembly. The cabinet may define a chilled chamber. The door may be rotatably hinged to the cabinet to provide selective access to the chilled chamber. The shelf assembly may be disposed below the image module within the chilled chamber. The shelf assembly may include a mounting bracket attached to the cabinet, a shelf attached to the mounting bracket, and a weight sensor disposed within the cabinet in cantilevered engagement with the shelf to detect stored mass at the shelf.

20 Claims, 13 Drawing Sheets

(56) References Cited

U.S. PATENT DOCUMENTS

| | | | |
|---|---|---|---|
| 2014/0320040 A1* | 10/2014 | Katu | H05B 45/20 |
| | | | 362/92 |
| 2016/0048798 A1* | 2/2016 | Meyer | G01G 19/42 |
| | | | 705/28 |
| 2017/0249587 A1* | 8/2017 | Jones | G06Q 10/087 |
| 2018/0259245 A1* | 9/2018 | Abeygunawardana | |
| | | | A47B 57/06 |
| 2019/0205821 A1 | 7/2019 | Danyluk | |
| 2019/0353421 A1* | 11/2019 | Junge | G01G 19/414 |
| 2019/0378104 A1 | 12/2019 | Milan | |
| 2020/0072659 A1* | 3/2020 | Buhlmeyer | G01G 19/42 |
| 2020/0208904 A1* | 7/2020 | Choy | F25D 23/126 |
| 2021/0030169 A1* | 2/2021 | Zhai | A47F 5/0823 |
| 2021/0055043 A1* | 2/2021 | Wantland | H01R 25/162 |
| 2021/0088270 A1* | 3/2021 | Allgeier | A47B 51/00 |
| 2021/0164725 A1* | 6/2021 | Kumar | F25D 25/024 |
| 2022/0067642 A1* | 3/2022 | Barton | G01G 19/52 |
| 2022/0268512 A1* | 8/2022 | Katkar | A47F 3/0486 |

* cited by examiner

REFRIGERATOR APPLIANCE HAVING A WEIGHT-DETECTING SHELF ASSEMBLY

FIELD OF THE INVENTION

The present subject matter relates generally to refrigerator appliances, and more particularly to refrigerator appliances having features for detecting the weight of items on shelf assembly.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase undesired items or fail to purchase items that are nearly finished. For instance, items, such as liquids or produce, are stored within containers that are difficult for a user to see inside. Such items may be used irregularly and partially so that the entire contents of a container are only emptied after multiple uses. Additionally or alternatively, some users may be unaware that certain items have been removed or consumed. As a result, a user may be unable to determine when the container is nearly empty and in need of replacing.

Some existing appliances have attempted to address these issues by requiring a user to manually input each item being stored. Other appliances have used various methods, such as scales, to estimate or guess the quantity or identification of items being stored. Nonetheless, such attempts have been insufficiently cumbersome or expensive. For instance, typical scales require various wires to be routed to a specific shelf or region of the appliance. If multiple scales or weight-sensing regions are desired, additional wires and connections are obviously required. As a result, the complexity and cost associated with detecting the weight of loads (especially across multiple shelves) is significant. Moreover, even once a weight is detected, conventional systems require a user to manually input or know what items are being weighed, which can be difficult or cumbersome.

Accordingly, a refrigerator appliance with features for assisting a user with tracking contents of a chilled chamber of the refrigerator appliance would be useful. In particular, a refrigerator appliance with features for assisting a user with accurately tracking the amount or volume of contents of a chilled chamber of the refrigerator appliance without significantly complicating assembly or operation (e.g., across multiple shelves) would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, and a shelf assembly. The cabinet may define a chilled chamber. The door may be rotatably hinged to the cabinet to provide selective access to the chilled chamber. The shelf assembly may be disposed below the image module within the chilled chamber. The shelf assembly may include a mounting bracket attached to the cabinet, a shelf attached to the mounting bracket, and a weight sensor disposed within the cabinet in cantilevered engagement with the shelf to detect stored mass at the shelf.

In another exemplary aspect of the present disclosure, a refrigerator appliance is provided. The refrigerator appliance may include a cabinet, a door, and a shelf assembly. The cabinet may define a chilled chamber. The door may be rotatably hinged to the cabinet to provide selective access to the chilled chamber. The shelf assembly may be disposed below the image module within the chilled chamber. The shelf assembly may include a mounting bracket attached to the cabinet, a shelf attached to the mounting bracket, a sensor housing disposed within the chilled chamber and movable relative to the mounting bracket, and a weight sensor fixed to the sensor housing in cantilevered engagement with the shelf to detect stored mass at the shelf.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
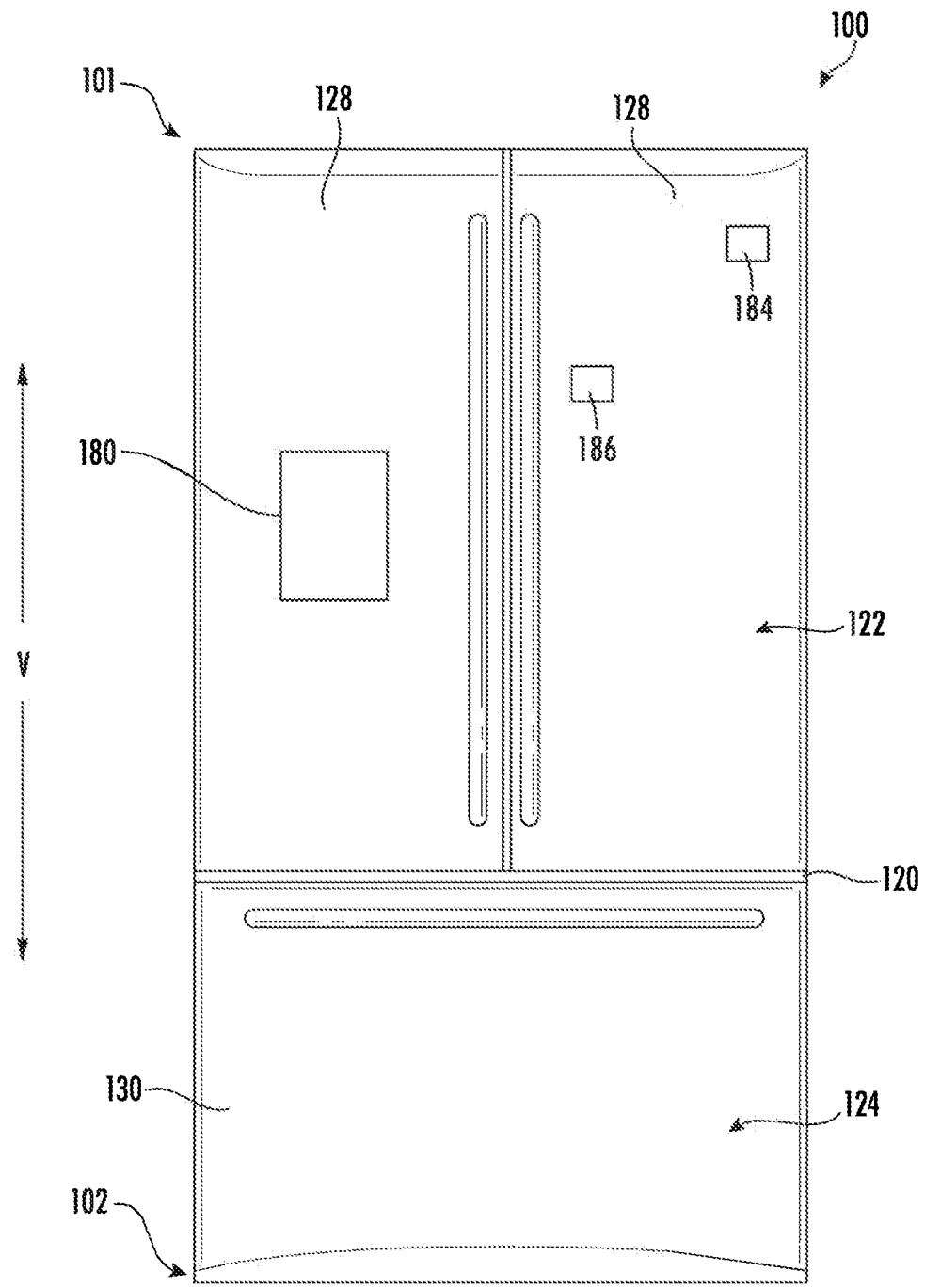
FIG. 1 provides a front elevation view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
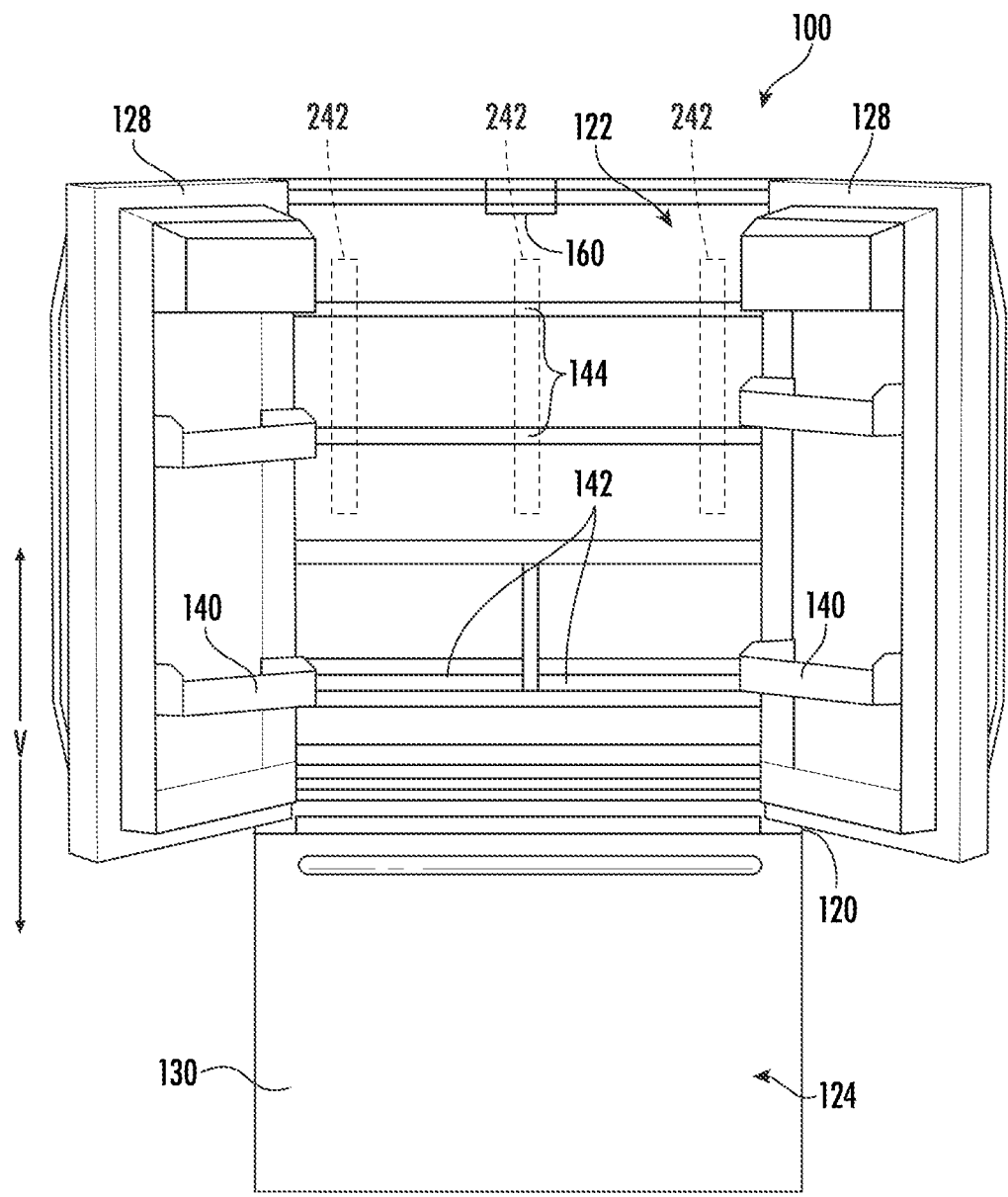
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top 101 and a bottom 102 along a vertical direction V. Cabinet 120 defines chilled chambers for receipt of food items for storage. In particular, cabinet 120 defines fresh food chamber 122 positioned at or adjacent top 101 of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items. As will be described in greater detail below, one or more shelves 144 or drawers 142 may be included with or as part of a shelf assembly 200 mounted to an inner liner of fresh food chamber 124.

Refrigerator appliance 100 also includes features for assisting a user with identifying food items positioned within fresh food chamber 122 or freezer chamber 124. The user can utilize such features, for example, to view food items stored (i.e., stored items) within fresh food chamber 122 or freezer chamber 124 or create an inventory of such stored items. Such features are discussed in greater detail below.

Figure 3:
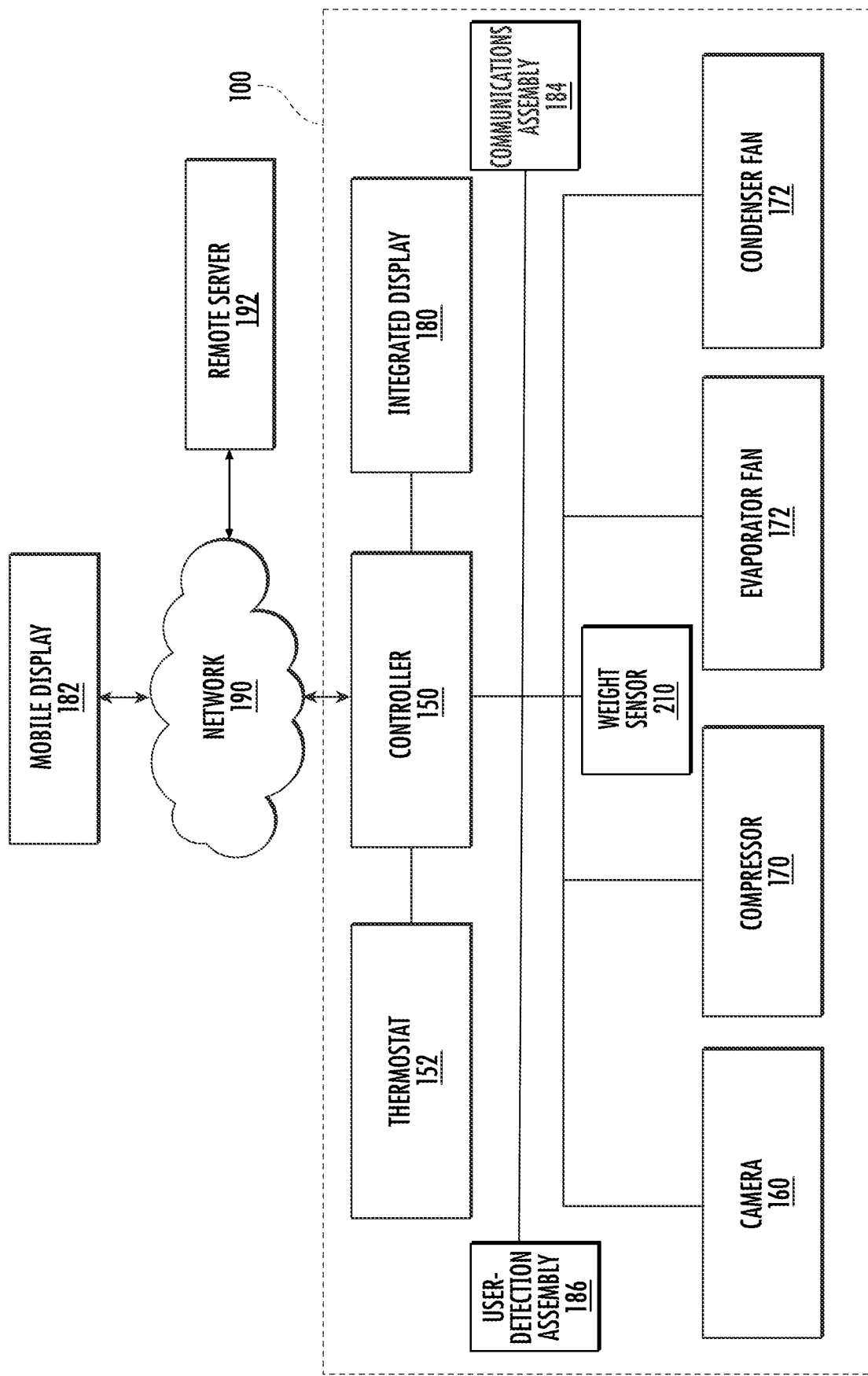
FIG. 3 provides a schematic view of a refrigerator appliance according to exemplary embodiments of the present disclosure.
Figure 4:
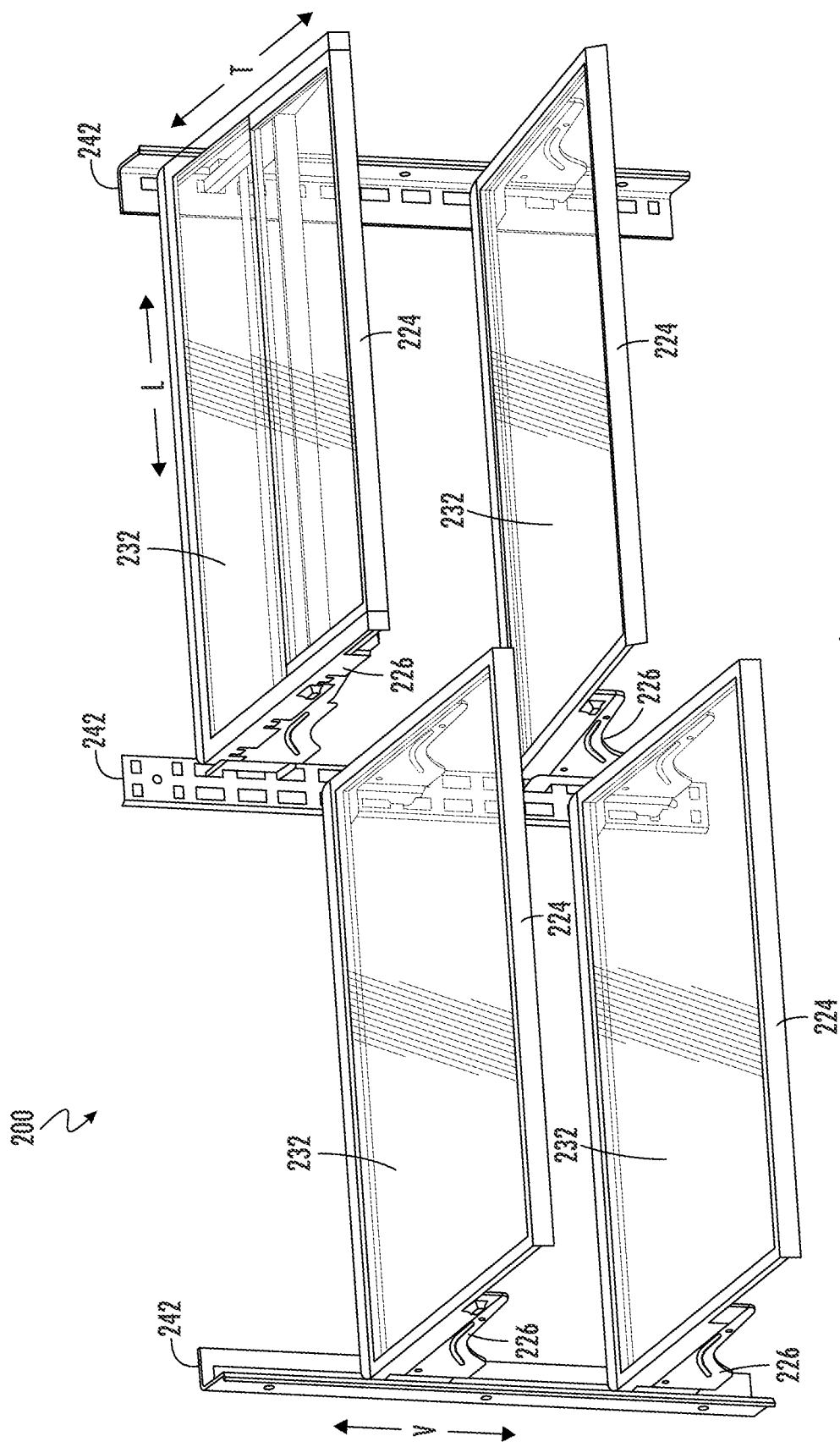
FIG. 4 provides a perspective view of a portion of a shelf assembly of a refrigerator appliance according to exemplary embodiments of the present disclosure.
Figure 5:
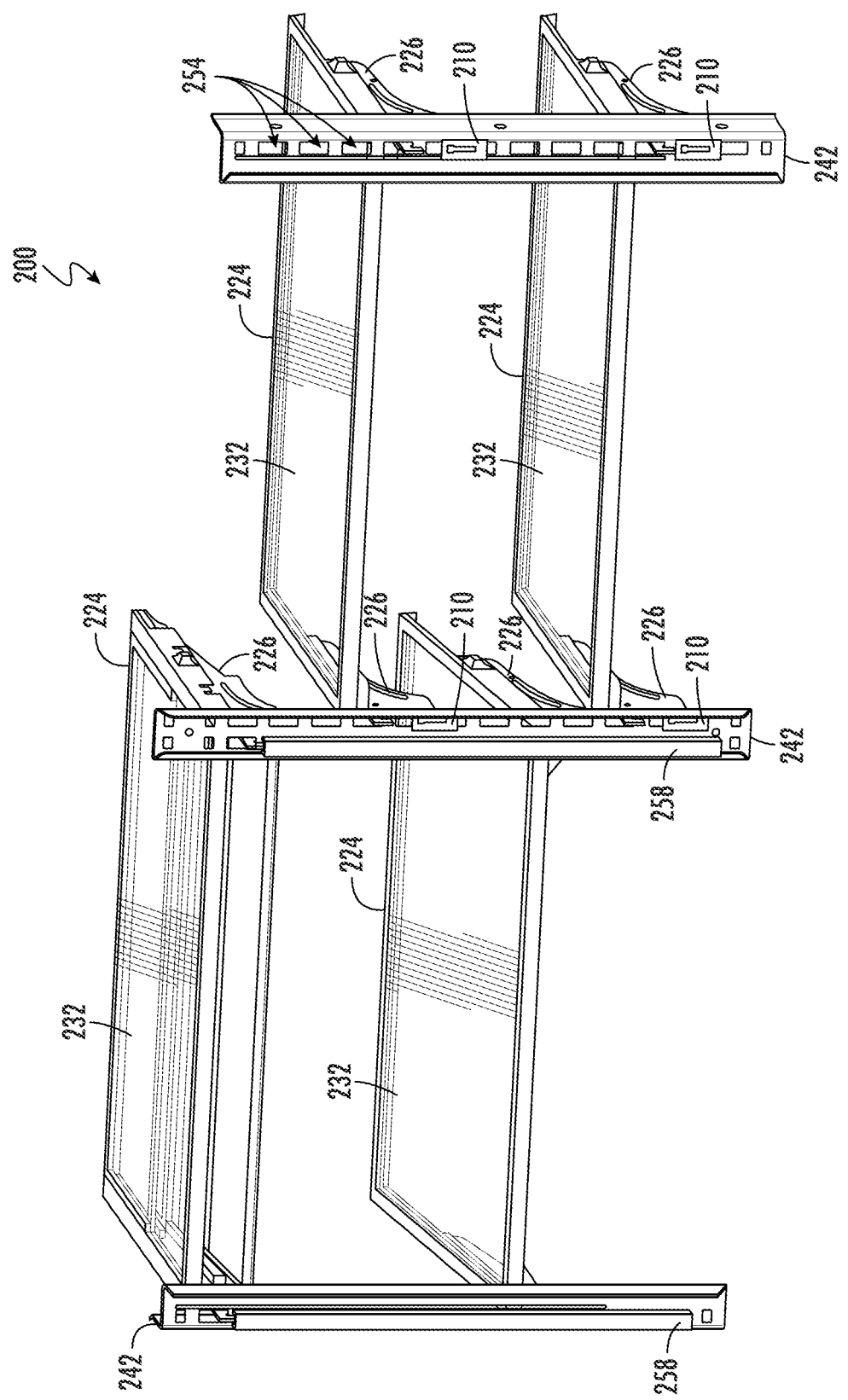
FIG. 5 provides a rear perspective view of the exemplary shelf assembly of FIG. 4.
Figure 7:
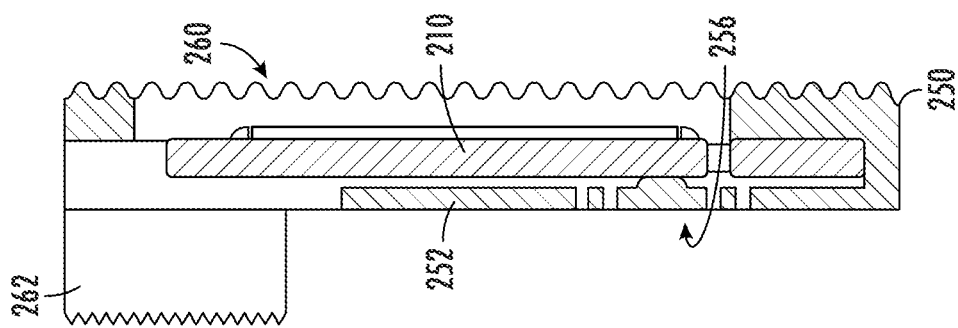
FIG. 7 provides a side section view of the weight sensor and sensor housing of the exemplary shelf assembly of FIG. 4.
Figure 6:
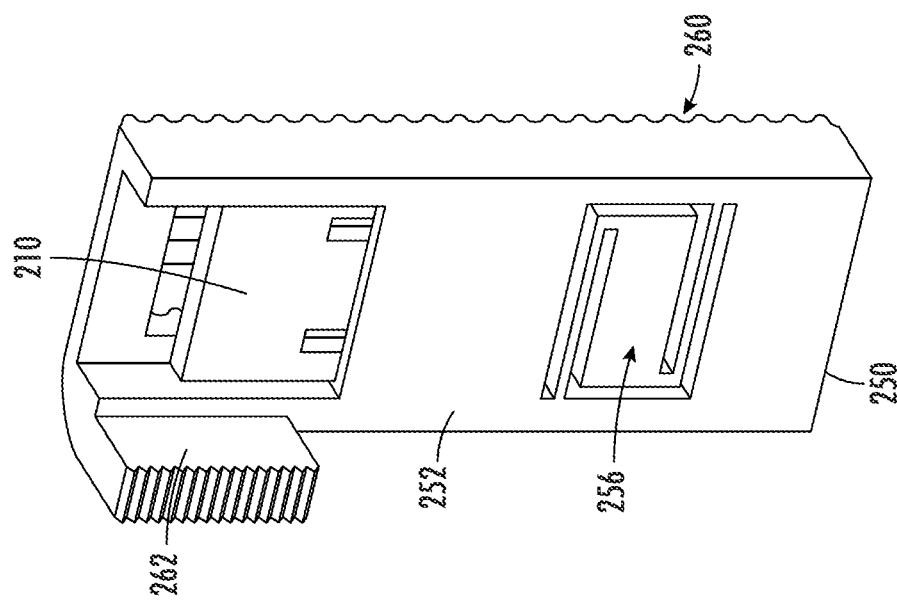
FIG. 6 provides a perspective view of the weight sensor and sensor housing of the exemplary shelf assembly of FIG. 4.
Figure 8:
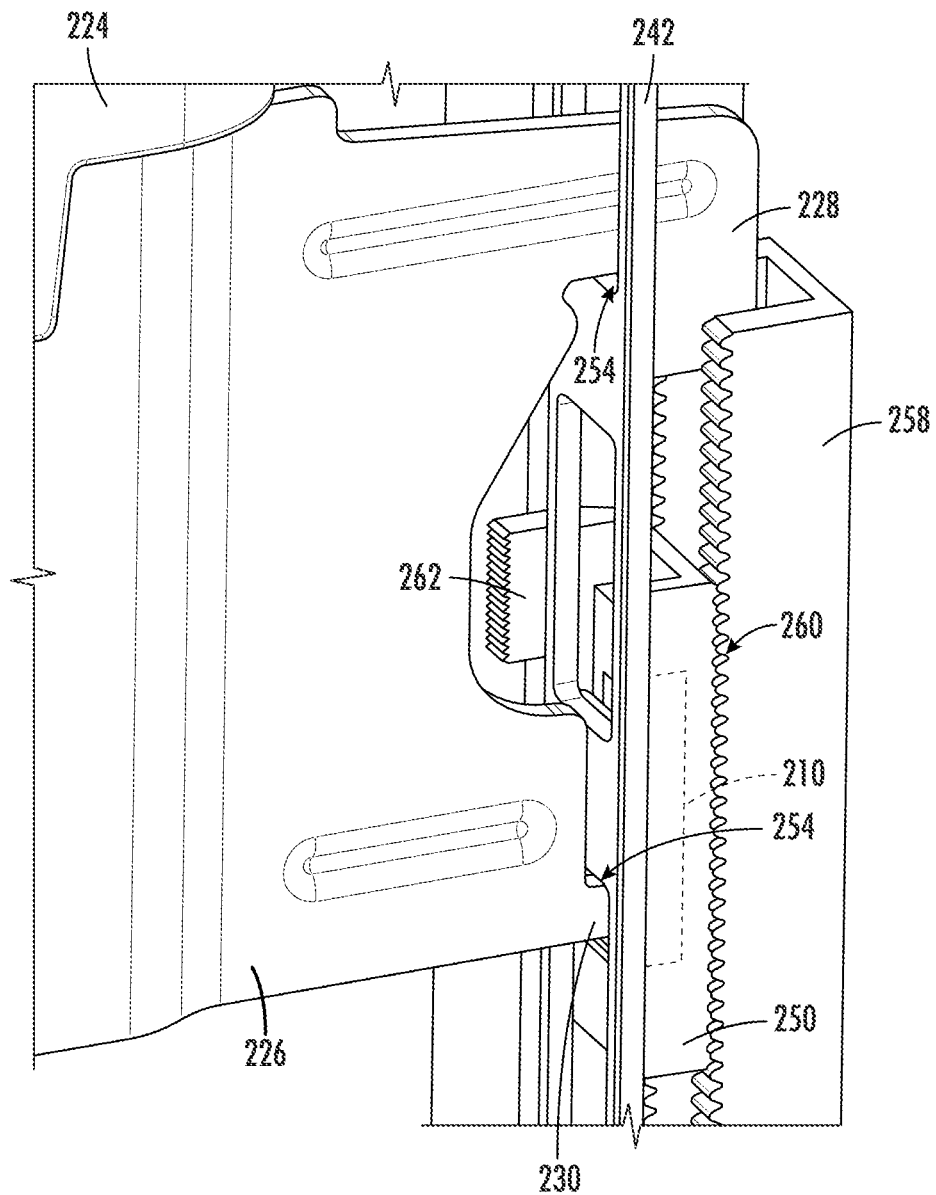
FIG. 8 provides a magnified perspective view of a portion of the exemplary shelf assembly of FIG. 4.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine. The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electric communication) with controller 150 via one or more conductive signal lines or shared communication busses. Additionally or alternatively, one or more components of refrigerator appliance 100 may be in communication (e.g., wireless communication) with controller 150 via one or more wireless signal bands.

In some embodiments, refrigerator appliance 100 also includes a camera or image module 160. Image module 160 may be any type of device suitable for capturing a two-dimensional picture or image. As an example, image module 160 may be a video camera or a digital camera with an electronic image sensor [e.g., a charge coupled device (CCD) or a CMOS sensor]. As an additional or alternative example, image module 160 may include a pressure-sensing mat including a plurality of pressure detection cells to detect the relative variations in pressure, as would be understood. The pressure-sensing mat may be disposed on one or more shelves 144 (or shelves 224—FIGS. 4 through 7) and, optionally, be formed from a substantially transparent material. Thus, the pressure-sensing mat may detect one or more objects placed on the corresponding shelf or shelves 144. Moreover, a two-dimensional image (e.g., of the footprint for one or more objects placed on the corresponding shelf 144) may be assembled using the signals received from the pressure-sensing mat. As a further additional or alternative example, image module 160 may include a beam-emission sensor (e.g., lidar, radar, etc.) to detect objects within a line of sight or transmission of the sensor, as would be understood.

When assembled, image module 160 is in communication (e.g., electric or wireless communication) with controller 150 such that controller 150 may receive a signal from image module 160 corresponding to the image captured by image module 160.

Generally, image module 160 is positioned on refrigerator appliance 100. In some embodiments, image module 160 is mounted within fresh food chamber 122 at a top portion thereof (e.g., adjacent top 101). For instance, image module 160 may be fixed to or directed through a top wall of an internal liner defining fresh food chamber 122. In such embodiments, image module 160 may be directed downward, as illustrated in FIG. 2.

In certain embodiments, image module 160 is directed toward one or more chilled chamber (e.g., fresh food chamber 122—FIG. 2). For instance, image module 160 may be directed towards at least a portion of any particular one of or combination of drawers 142 and shelves 144 (FIG. 2). Thus, in some such embodiments, image module 160 can capture images of one of drawers 142, all of drawers 142, one of shelves 144, all of shelves 144, or any suitable combination thereof.

Although image module 160 is illustrated as being mounted within fresh food chamber 122, it is understood that additional or alternative embodiments include a camera or image module [e.g., digital camera with an electronic image sensor, such as a charge coupled device (CCD) or a CMOS sensor; a pressure-sensing mat; a beam emitting sensor; etc.] mounted at another suitable portion of refrigerator appliance, such as a door 128. Such a camera assembly may be directed outward or in front of refrigerator appliance 100 and may thus capture images of a user or area positioned forward from refrigerator appliance 100 (e.g., when the corresponding door is in a closed position).

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in communication with controller 150 such that integrated display 180 may receive a signal from controller 150 corresponding to an image captured by image module 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

Separate from or in addition to integrated display 180, refrigerator 100 may include a communications assembly 184 in communication with controller 150. Generally, communications assembly 184 may be mounted on any suitable portion of refrigerator 100, such as within cabinet 120 or a door 128. In certain embodiments, the communications assembly includes a loudspeaker (e.g., dynamic loudspeaker, electrostatic loudspeaker, planar magnetic loudspeaker, piezoelectric loudspeaker etc.). As is understood, the loudspeaker may be configured to generate soundwaves from one or more electrical signals (e.g., digital sound signals received from controller 150). The loudspeaker may thus audibly communicate information to a user. In additional or alternative embodiments, the communications assembly includes a microphone (e.g., dynamic microphone, ribbon microphone, fiber-optic microphone, piezoelectric microphone, etc.). As is understood, the microphone may generate one or more electrical signals (e.g., to be received by controller 150) from one or more received soundwaves (e.g., from a user). The microphone may thus receive audible prompts or commands from a user that can be directed to the controller 150.

In exemplary embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In optional embodiments, refrigerator appliance 100 includes a user-detection assembly 186. Generally, user-detection assembly 186 includes one or more sensors configured to detect a biometric or personalized marker corresponding to a specific individual user. As an example, user-detection assembly 186 may include a forward-facing camera configured to recognize or identify a user's face based on a captured two-dimensional image. As another example, user-detection assembly 186 may include a fingerprint imaging sensor configured to visually detect a user's fingerprint. As yet another example, user-detection assembly 186 may include a signal-detection sensor configured to detect a device address over a wireless communications band (e.g., a BLE band using short-wavelength UHF radio waves in the ISM band from 2.4 to 2.485 GHz). The device address may be a programmed Bluetooth address of, for instance, mobile display 182. The user-detection assembly 186 may thus determine if and when a mobile display 182 is within close proximity to refrigerator appliance 100.

In certain embodiments, image module 160 is included as part of user-detection assembly 186. As an example, user-detection assembly 186 may be configured to recognize or identify a user from a two-dimensional image captured at image module 160. In some such embodiments, controller 150 is further configured to recognize one or more defining features below a user's elbow, such as skin tone, arm/hand size, jewelry, typical clothing, etc. As is understood, recognizing such defining features may be performed by edge matching, divide-and-conquer search, greyscale matching, histograms of receptive field responses, or another suitable routine (e.g., executed at the controller 150 based on one or more captured images from image module 160).

During use, such as during an image capture sequence, image module 160 may capture one or more two-dimensional images (e.g., as a video feed or series of sequential static images) that may be transmitted to the controller 150 (e.g., as a data signal), as is generally understood. Optionally, the image capture sequence may be initiated by a predetermined user action, such as opening a door 128, detected movement within a chilled chamber (e.g., fresh food chamber 122), engaging or moving within range of user-detection assembly 186, proving a user input at communications assembly 184 or integrated display 180, etc.

One or more weight sensors 210 may be further provided within fresh food chamber 122 or freezer chamber 124, as will be described in greater detail below. Generally, weight sensor 210 is provided as or includes any suitable electronic load sensor or cell configured to generate one or more electronic signals according (e.g., in proportion to) a load thereon. For instance, weight sensor 210 may include a suitable strain gauge (e.g., foil strain gauge), force sensitive resistor, capacitance sensor, hydraulic sensor, or pneumatic sensor—as would be understood. When assembled, weight sensor 210 may be in operable (e.g., electric or wireless) communication with controller 150 and may, thus, transmit one or more signals thereto (e.g., in accordance with a weight or mass detected at weight sensor 210).

In some embodiments, one or more remote servers 192, such as a web server, is in operable communication with controller 150. The remote server 192 can be used to host a retailer's point of sale system. In other words, remote server 192 may be or include a retailer point of sale server that tracks, for example, an identifier and quantity of purchased items, a time or date stamp of purchased items, pricing of purchased items, a customer identifier (i.e., an identifier of the purchasing customer), etc. Additionally or alternatively, the remote server 192 can be used to host a retailer's stock management system. In other words, remote server 192 may include, or be provided as, a retailer stock management server that tracks, for example, stocking data relating to items offered for sale by a retailer (e.g., expiration data, location data, cost data, etc.). Also additionally or alternatively, the remote server 192 can be used to host one or more information databases.

The remote server 192 can be implemented using any suitable computing device(s). The remote server 192 may include one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions which are executed by the processor to cause remote server 192 to perform operations. For example, instructions could be instructions for receiving/transmitting point of sale data signals, receiving/transmitting inventory management data signals, receiving/transmitting data signals relating to a stored item, etc.

The memory devices may also include data, such as point of sale data, customer identification data, inventory data, expiration data, etc., that can be retrieved, manipulated, created, or stored by processor. The data can be stored in one or more databases. The one or more databases can be connected to remote server 192 by a high bandwidth LAN or WAN, or can also be connected to remote server 192 through network 502. The one or more databases can be split up so that they are located in multiple locales.

Remote server 192 includes a network interface such that remote server 192 can connect to and communicate over one or more networks (e.g., network 190) with one or more network nodes. In turn, remote server 192 can exchange data with one or more nodes over the network 190. In particular, remote server 192 can exchange data with controller 150. Although not pictured, it is understood that remote server 192 may further exchange data with any number of client devices over the network 190 (e.g., mobile display 182).

Turning now generally to FIGS. 4 through 14, various views of exemplary embodiments of a shelf assembly 200 are provided. As shown, shelf assembly 200 includes one more mounting brackets 242 and shelves 224 (e.g., included with or as shelves 144—FIG. 2), along with one or more weight sensors 210. When assembled, mounting brackets 242 may be attached to cabinet 120 (FIG. 2), such as at a rear portion of fresh food chamber 122. In some embodiments, mounting brackets 242 are mounted on or as part of an inner liner of fresh food chamber 122. Additionally or alternatively, mounting brackets 242 may include or be provided as vertically extending rails. In the illustrated embodiments, mounting brackets 242 are mounted to a rear wall 240 of the inner liner (e.g., via one or more mechanical fasteners, adhesives, etc.). Optionally, a plurality of mounting brackets 242 may be secured to support panel 212 to selectively attach one or more shelves 224. For instance, the mounting brackets 242 may be fixed to a rear wall 240 of cabinet 120 while one or more shelves 224 may move relative to mounting brackets 242 (e.g., as directed by a user). In some such embodiments, the mounting brackets 242 define a plurality of discrete heights at which a first shelf 224 or a second shelf 224 may be attached. The discrete heights may be provided, as an example by corresponding holes or grooves on which a mating hook 228 or engagement tab 230 of a shelf 224 may be hung or held.

Generally, an individual shelf 224 includes a platform or surface to receive stored items or objects placed within the corresponding chilled chamber (e.g., fresh food chamber 122). In some embodiments, a shelf 224 includes a horizontal platform 232 (e.g., formed from a rigid material, such as a solid polymer, glass, ceramic or metal). The horizontal platform 232 may be joined to a cantilever bracket 226 that extends rearward from horizontal platform 232 to attach an individual shelf 224 to mounting bracket 242. At least a portion of cantilever bracket 226 may be vertically offset from (e.g., below or above) horizontal platform 232. In the exemplary embodiments, cantilever bracket 226 is disposed below horizontal platform 232. When assembled, cantilever bracket 226 may hold shelf 224 to mounting bracket 242. For instance, cantilever bracket 226 may selectively join to mounting bracket 242 (e.g., at one or more predefined channels or grooves). Optionally, cantilever bracket 226 may include mating hook 228 or engagement tab 230 which may be inserted into mounting bracket 242 to hold shelf 224 at a predetermined height (e.g., within fresh food chamber 122).

In some embodiments, multiple discrete shelves 224 are provided. Such shelves 224 may be spaced apart from each other. As an example, two or more shelves 224 may be spaced apart along the vertical direction V. As an additional or alternative example, two or more shelves 224 may be spaced apart along the lateral direction L. As a result, multiple surface planes may be defined to receive stored items thereon. Optionally, multiple shelves 224 may be attached to one or more common mounting brackets 242.

Thus, a first shelf 224 and a second shelf 224 may be attached to cabinet 120 via the same mounting bracket(s) 242. In some embodiments, one or more of the shelves 224 may be selectively movably mounted such that the height or lateral side at which at least one shelf 224 is held on support panel 212 may be varied (e.g., to accommodate stored items of various sizes or shapes within the fresh food chamber 122).

As noted above, one or more weight sensors 210 are provided within cabinet 120. Generally, at least one weight sensor 210 is disposed within cabinet 120 and configured to detect the stored mass on one or more corresponding shelves 224 (i.e., the weight or mass of stored items or objects placed on the corresponding shelves 224). Specifically, weight sensor 210 is configured to detected stored mass via cantilevered engagement. Thus, weight sensor 210 may be provided in cantilevered engagement with the corresponding shelf 224 or shelves 224. For instance, a foil strain gauge may receive a transverse force transferred thereto at a point that is vertically offset from the horizontal platform 232 of a corresponding shelf 224. Advantageously, weight sensor 210 may provide for weight or mass detection on the corresponding shelf 224 without requiring wires or connections to be routed directly beneath the shelf 224 (e.g., within fresh food chamber 122), which might otherwise complicate assembly or interfere with daily use.

In some embodiments, weight sensor 210 is attached or fixed to a sensor housing 250, which may support or house at least a portion of weight sensor 210. For instance, sensor housing 250 may include a cell body 252 that defines a pocket within which weight sensor 210 is held. The sensor housing 250 itself may be disposed (e.g., selectively or fixedly) with fresh food chamber 122. Moreover, sensor housing 250 may be movable relative to one or more mounting bracket 242. Specifically, sensor housing 250 may be moved within cabinet 120 relative to a stationary mounting bracket 242 or sensor housing 250 may be fixedly mounted within cabinet 120 while mounting bracket 242 is permitted some degree of translation or rotation relative to a portion of cabinet 120 and sensor housing 250.

Turning now especially to FIGS. 4 through 8, in exemplary embodiments, weight sensor 210 is disposed behind a mounting bracket 242. Specifically, weight sensor 210 is mounted behind mounting bracket 242 at a rear portion of fresh food chamber 122. As shown, mounting bracket 242 may define one or more apertures 254 through which a portion of shelf 224 or cantilever bracket 226 may be received. For instance, engagement tab 230 may be received through an aperture 254. A mating hook 228 may be received through another aperture 254 (e.g., above engagement tab 230). In some such embodiments, the mounting brackets 242 define a plurality of discrete heights at which the first shelf 224 or the second shelf 224 may be attached. The discrete heights may be provided, as an example by corresponding apertures 254 on which mating hook 228 and engagement tab 230 of a shelf 224 may be hung or held.

The aperture 254 through which engagement tab 230 is received may be horizontally (e.g., laterally or transversely) aligned with weight sensor 210. When disposed through the aperture 254, engagement tab 230 may extend to and be disposed against weight sensor 210 (e.g., directly or indirectly). In some such embodiments, cantilever bracket 226 contacts a resilient region 256 defined by sensor housing 250 (e.g., in front of weight sensor 210). During use, resilient region 256 may deform in response to the transverse force directed through engagement tab 230 and transfer at least a portion of such force to the weight sensor 210.

In certain embodiments, the sensor housing 250 or weight sensor 210 is movably mounted with cabinet 120 (e.g., within fresh food chamber 122). Specifically, the vertical height (i.e., position along the vertical direction V relative to cabinet 120) of sensor housing 250 and weight sensor 210 may be adjustable (e.g., manually or automatically). In some such embodiments, sensor housing 250 may be slidably mounted to mounting bracket 242. Thus, sensor housing 250 moves (e.g., slides) vertically along or relative to mounting bracket 242. Such movements may be directed by a user, either manually or automatically based on an input provided to controller 150. In some such embodiments, an electronic motor, such as a linear actuator (not pictured) is attached to housing to motivate sensor housing 250 (e.g., up and down), as would be understood. Optionally, a plurality of discrete heights may be defined for the sensor housing 250 (and thus weight sensor 210). Such heights may generally correspond to predefined heights for a shelf 224. In turn, a user may ensure that weight sensor 210 is engaged by shelf 224 regardless of what height the shelf 224 is moved to.

In the illustrated embodiments of FIGS. 4 through 8, a barbed back rail 258 is mounted within cabinet 120. As shown, barbed back rail 258 may be disposed rearward from (e.g., directly behind) mounting bracket 242. When assembled, sensor housing 250 may be held between the barbed back rail 258 and mounting bracket 242 (e.g., along the transverse direction T). Thus, transverse movement of sensor housing 250 may be restricted.

Barbed back rail 258 may be arranged such that its barbs are vertically spaced apart and can, in turn, define a plurality of heights (e.g., for supporting sensor housing 250). Moreover, barbed back rail 258 may be fixed to (or relative to) an inner liner defining fresh food chamber 122. Sensor housing 250 may include one or more contact teeth 260 that are complementary to the barbs of barbed back rail 258. The assembled shelf assembly 200 may provide the contact teeth 260 selective engagement with the one or more barbs of the barbed back rail 258 to hold the sensor housing 250 at a variable height. Specifically, through the complementary arrangement, contact teeth 260 may engage the barbs of back rail 258 and, in turn, hold sensor housing 250 at a selected height. Nonetheless, sensor housing 250 may be selectively movable along the vertical direction V, such as by lifting the teeth of sensor housing 250 off of one or more barbs of barbed back rail 258 at one height, sliding sensor housing 250 vertically to some other height, and placing the teeth on the barbs of barbed back rail 258 that correspond to that other height. Optionally, a front grip 262 may extend from sensor housing 250 (e.g., forward or transversely, away from contact teeth 260) to permit a user to readily grab and manipulate sensor housing 250 along mounting bracket 242 or barbed back rail 258.

Figure 9:
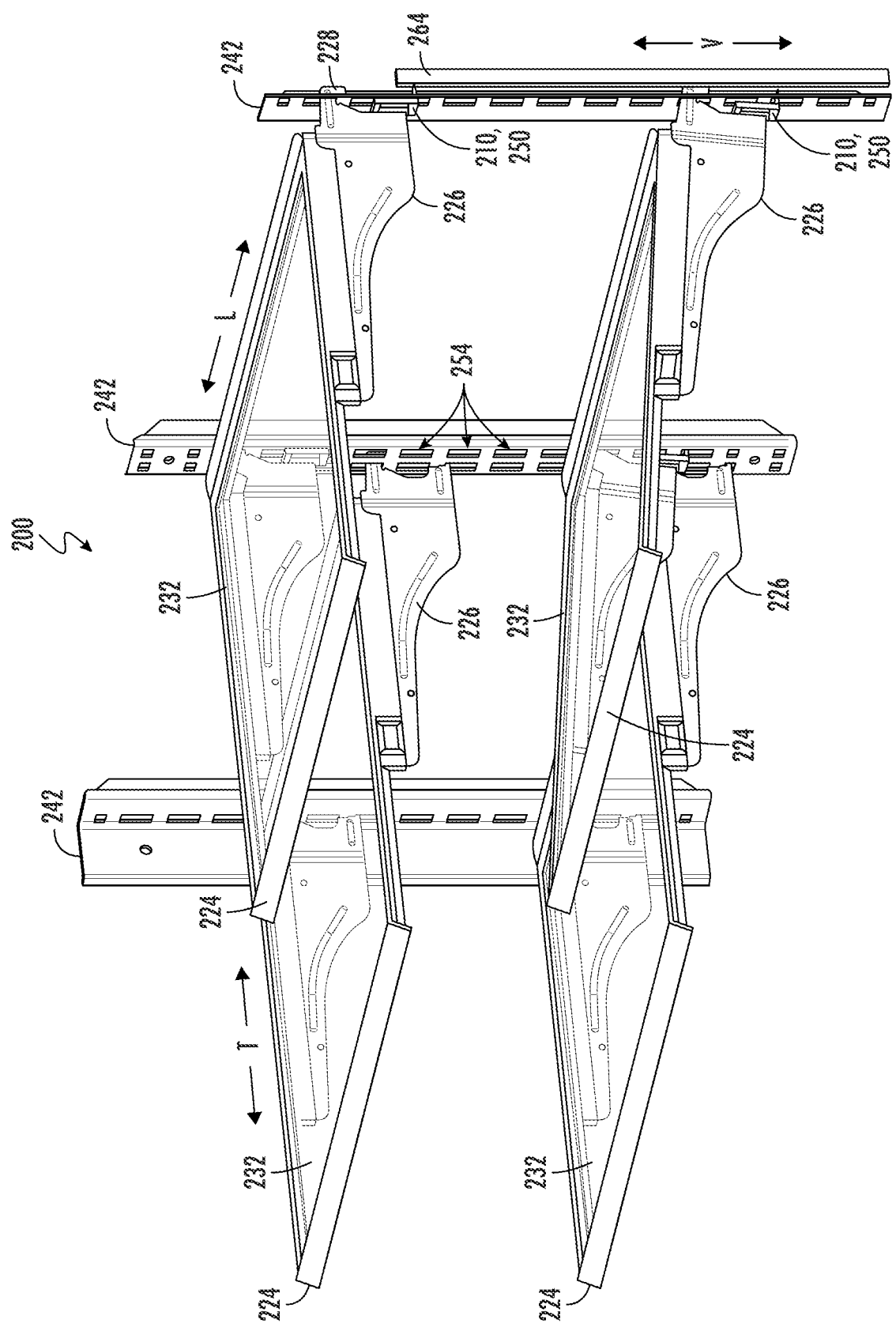
FIG. 9 provides a perspective view of a portion of a shelf assembly of a refrigerator appliance according to exemplary embodiments of the present disclosure.
Figure 10:
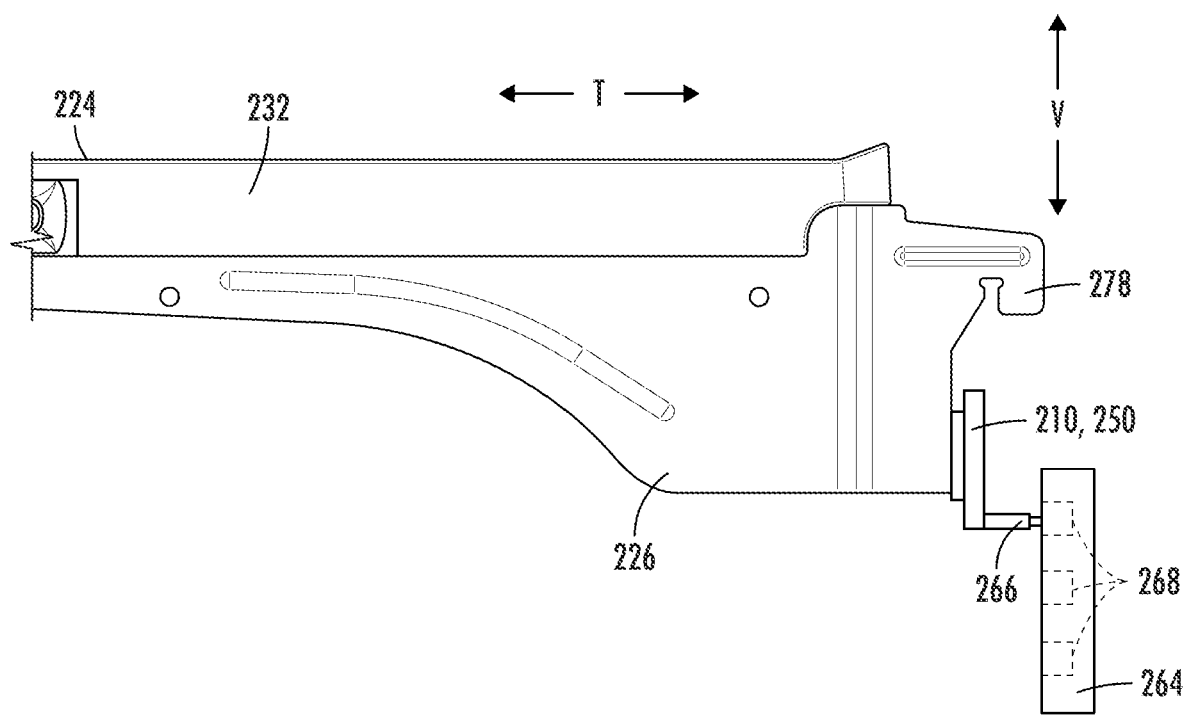
FIG. 10 provides a partial, side, elevation view of a portion of the exemplary shelf assembly of FIG. 9.

Turning now especially to FIGS. 9 and 10, in exemplary embodiments, weight sensor 210 may be directly attached to shelf 224. For instance, weight sensor 210 may be secured to cantilever bracket 226 below horizontal platform 232. In some such embodiments, sensor housing 250 is fixed to cantilever bracket 226. Optionally, sensor housing 250 may be disposed below mating hook 228. As described above, with respect to FIGS. 4 through 8, shelf 224 may be selectively movable to discrete heights on mounting bracket 242. In contrast to those embodiments, though, sensor housing 250 may move with the corresponding shelf 224 to selectively separate from mounting bracket 242.

In some such embodiments, a selective electrical connection is established between weight sensor 210 and another portion of appliance 100 (e.g., controller 150—FIG. 3).

Specifically, a female connector bar 264 and a male connector 266 may define a conductive path permitting a signal to pass from weight sensor 210 to another portion of appliance 100. As shown, female connector bar 264 may be disposed rearward from (e.g., directly behind) the mounting bracket 242. Female connector bar 264 may be wired to another portion of cabinet 120 and define multiple female ports 268 aligned with multiple corresponding apertures 254 of mounting bracket 242. Male connector 266 may extend rearward from cell body 252 to be received through such apertures 254 of mounting bracket 242. When assembled, male connector 266 may join to at least one female port 268 to establish electrical communication between the two.

Figure 11:
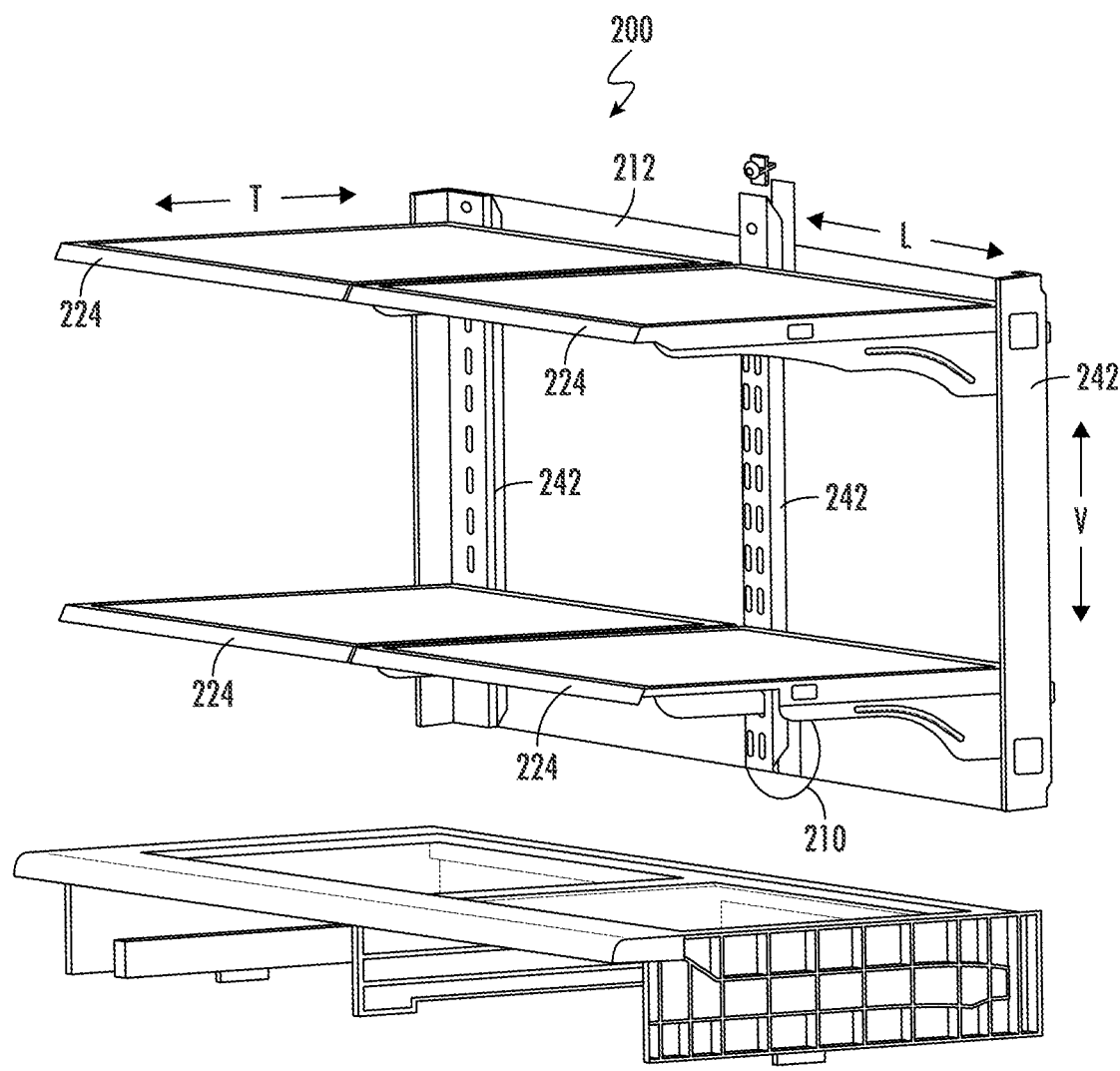
FIG. 11 provides a perspective view of a portion of a shelf assembly of a refrigerator appliance according to exemplary embodiments of the present disclosure.
Figure 12:
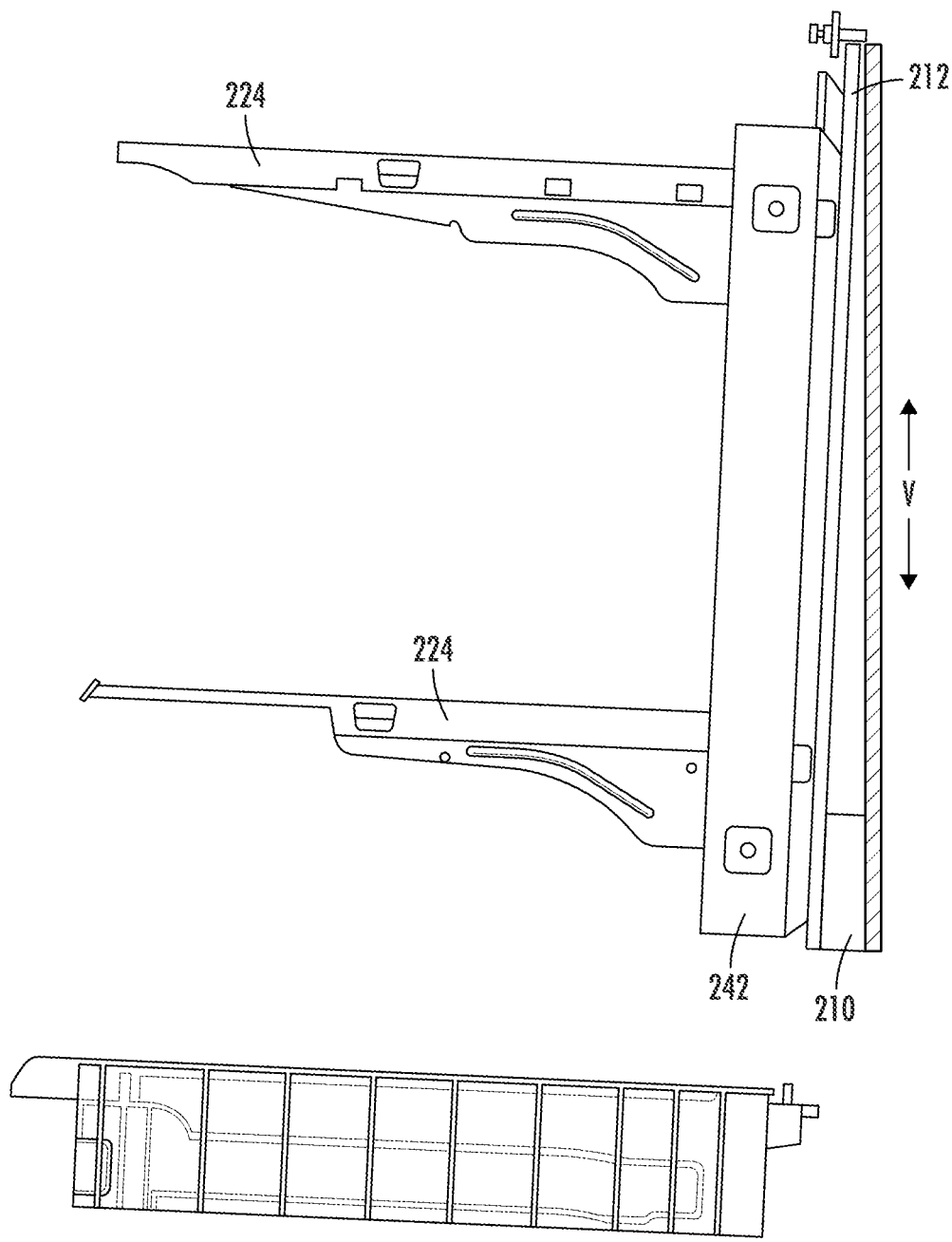
FIG. 12 provides a side elevation view of a portion of the exemplary shelf assembly of FIG. 11.

Turning especially to FIGS. 11 and 12, a support panel 212 may be provided to attach mounting bracket 242 to cabinet 120. For instance, support panel 212 may be fixed to cabinet 120 at a top end of support panel 212. Mounting brackets 242 may be fixed to support panel 212. Moreover, multiple spaced apart shelves 224 may be attached to support panel 212. For instance, shelves 224 may be secured to one or more mounting brackets 242 forward from support panel 212 such that support panel 212 is disposed rearward from one or more shelves 224. Weight sensor 210 may be mounted on cabinet 120 or support panel 212 apart from one or more (e.g., all) of the shelves 224. In certain embodiments, weight sensor 210 is disposed below the shelves 224. Specifically, weight sensor 210 may be mounted at or proximal to a bottom end of support panel 212. As shown, weight sensor 210 may be sandwiched between the cabinet 120 and the support panel 212 for cantilevered engagement therewith. Advantageously, weight sensor 210 may detect a mass load across multiple discrete shelves 224.

Figure 13:
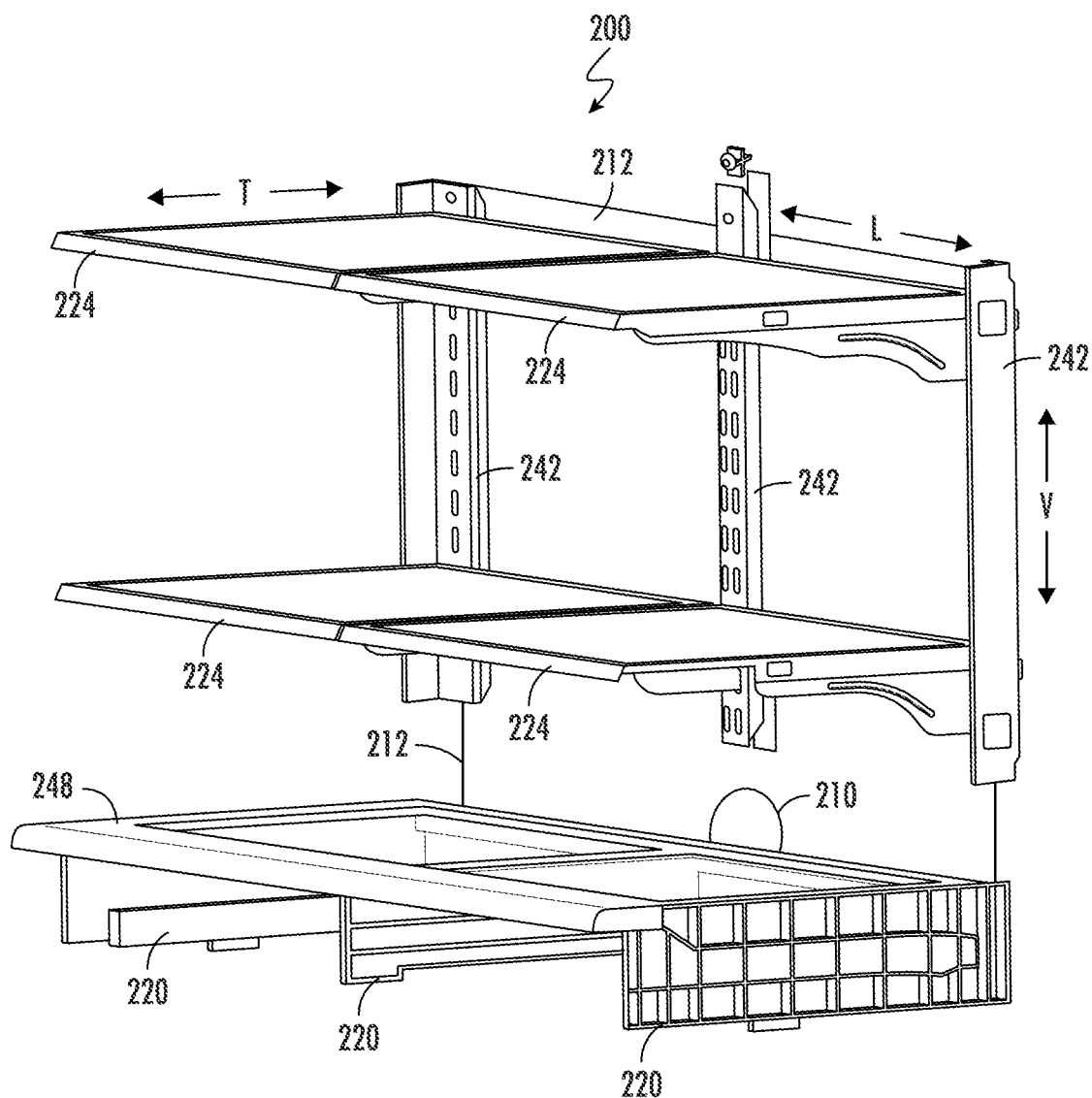
FIG. 13 provides a perspective view of a portion of a shelf assembly of a refrigerator appliance according to exemplary embodiments of the present disclosure.
Figure 14:
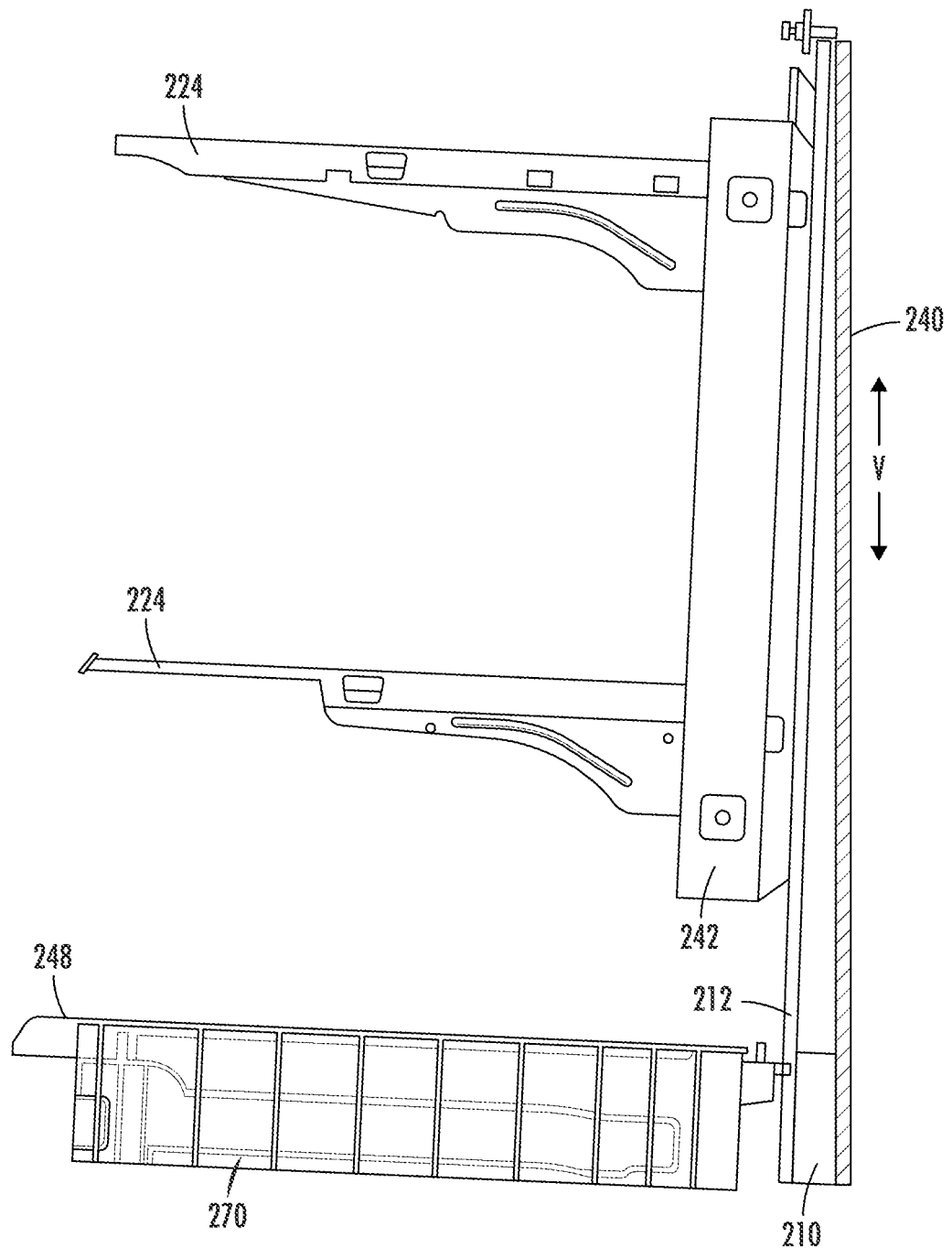
FIG. 14 provides a side elevation view of a portion of the exemplary shelf assembly of FIG. 13.

Turning especially to FIGS. 13 and 14, similar to the embodiments of FIGS. 11 and 12, weight sensor 210 may be disposed proximal to a drawer-support shelf 248. In some embodiments, the drawer-support shelf 248 includes or is attached to one or more slide brackets 270 for receiving a sliding storage drawer 142 (FIG. 2). In turn, the one or more slide brackets 270 may be mounted to support panel 212 (e.g., via drawer-support shelf 248). Moreover, storage drawer 142 may be slidably received on slide bracket 270. For instance, storage drawer 142 may be slidably received below drawer-support shelf 248. Weight sensor 210 may be mounted above storage drawer 142. Advantageously, weight sensor 210 may detect a mass load across multiple discrete shelves 224 (e.g., proximal to opposite panel sides) and held by slide bracket 270 (e.g., at drawer-support shelf 248).

Returning generally to FIGS. 2 through 14, in certain embodiments, image module 160 and controller 150 are configured to capture one or more two-dimensional images. Optionally, multiple, sequential, two-dimensional images may be captured (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. Optionally, the image capture sequence may subsequently be stopped or halted according to one or more end conditions, such as expiration of a predetermined time period, failure to detect further changes in sequential images, or closing of the door 128.

Separate from or in addition to the captured images, weight sensor 210 and controller 150 may be configured to detect the mass or weight of objects on the shelves 224 or drawers 142 of shelf assembly 200 (e.g., according to a predetermined scheduled or in tandem with the image capture sequence). Such detections may generate a captured mass load.

From the captured images and mass load(s), controller 150 may automatically attempt to recognize items (e.g., stored items, such as food, or non-stored items such as a user appendage, a shelf, a movable drawer, etc.) within the field of view for the image module 160. As is understood, recognizing such items, may be performed by edge matching, divide-and-conquer search, greyscale matching, histograms of receptive field responses, or another suitable routine (e.g., executed at the controller 150 based on one or more captured images from image module 160). recognition may include or attempt to estimate the identification (e.g., what type of food or object is recognized) or quantity (e.g., number of discrete units, volume, or mass) of the stored item.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
    a cabinet defining a chilled chamber;
    a door being rotatably hinged to the cabinet to provide selective access to the chilled chamber; and
    a shelf assembly disposed within the chilled chamber, the shelf assembly comprising
        a mounting bracket attached to the cabinet,
        a shelf defining a support surface attached to the mounting bracket, and
        a weight sensor disposed within the cabinet and below the support surface in cantilevered engagement with the shelf to detect stored mass at the shelf above the weight sensor based on a rearward transverse force.

2. The refrigerator appliance of claim 1, wherein the shelf is a first shelf, and wherein the shelf assembly further comprises a second shelf attached to the mounting bracket and spaced apart from the first shelf.

3. The refrigerator appliance of claim 1, wherein the weight sensor is disposed behind the mounting bracket at a rear portion of the chilled chamber.

4. The refrigerator appliance of claim 1, wherein the shelf assembly further comprises
    a barbed back rail disposed rearward from the mounting bracket, and
    a sensor housing to which the weight sensor is held between the barbed back rail and the mounting bracket.

5. The refrigerator appliance of claim 4, wherein the sensor housing comprises one or more contact teeth in selective engagement with one or more barbs of the barbed back rail for holding the sensor housing at a variable height.

6. The refrigerator appliance of claim 1, wherein the mounting bracket defines a plurality of discrete heights at which the shelf may be selective attached, and wherein the shelf assembly further comprises a sensor housing to which the weight sensor is fixed and which may be selectively moved along mounting bracket between the plurality of discrete heights.

7. The refrigerator appliance of claim 1, wherein the shelf comprises a horizontal platform and a cantilever bracket extending rearward from the horizontal platform, the cantilever bracket being selectively held on the mounting bracket and comprising an engagement tab disposed against the weight sensor.

8. The refrigerator appliance of claim 1, wherein the shelf assembly further comprises
- a female connector bar in selective electrical communication with the weight sensor, the female connector bar being disposed rearward from the mounting bracket, and
- a sensor housing comprising a male connector and a cell body to which the weight sensor is held between the shelf and the mounting bracket, the male connector extending rearward from the cell body and through the mounting bracket to the female connector bar.

9. The refrigerator appliance of claim 1, wherein the shelf assembly further comprises
- a support panel attached to the cabinet, wherein the shelf is held on the support panel, and wherein the weight sensor is sandwiched between the cabinet and the support panel for cantilevered engagement therewith.

10. The refrigerator appliance of claim 9, wherein the shelf assembly further comprises
- a slide bracket mounted to the support panel, and
- a storage drawer slidably received on the slide bracket.

11. A refrigerator appliance comprising:
- a cabinet defining a chilled chamber;
- a door being rotatably hinged to the cabinet to provide selective access to the chilled chamber; and
- a shelf assembly disposed within the chilled chamber, the shelf assembly comprising
  - a mounting bracket attached to the cabinet,
  - a shelf defining a support surface attached to the mounting bracket,
  - a sensor housing disposed within the chilled chamber and movable relative to the mounting bracket, and
  - a weight sensor fixed to the sensor housing in cantilevered engagement with the shelf below the support surface to detect stored mass at the shelf above the weight sensor based on a rearward transverse force.

12. The refrigerator appliance of claim 11, wherein the shelf is a first shelf, and wherein the shelf assembly further comprises a second shelf attached to the mounting bracket and spaced apart from the first shelf.

13. The refrigerator appliance of claim 11, wherein the weight sensor is disposed behind the mounting bracket at a rear portion of the chilled chamber.

14. The refrigerator appliance of claim 11, wherein the shelf assembly further comprises a barbed back rail disposed rearward from the mounting bracket, and wherein the sensor is disposed between the barbed back rail and the mounting bracket.

15. The refrigerator appliance of claim 14, wherein the sensor housing comprises one or more contact teeth in selective engagement with one or more barbs of the barbed back rail for holding the sensor housing at a variable height.

16. The refrigerator appliance of claim 11, wherein the mounting bracket defines a plurality of discrete heights at which the shelf may be selective attached, and wherein the sensor housing is movable along mounting bracket between the plurality of discrete heights.

17. The refrigerator appliance of claim 11, wherein the shelf comprises a horizontal platform and a cantilever bracket extending rearward from the horizontal platform, the cantilever bracket being selectively held on the mounting bracket and comprising an engagement tab disposed against the weight sensor.

18. The refrigerator appliance of claim 11, wherein the shelf assembly further comprises a female connector bar in selective electrical communication with the weight sensor, the female connector bar being disposed rearward from the mounting bracket, and wherein the sensor housing comprises a male connector and a cell body to which the weight sensor is fixed between the shelf and the mounting bracket, the male connector extending rearward from the cell body and through the mounting bracket to the female connector bar.

19. The refrigerator appliance of claim 11, wherein the shelf assembly further comprises a support panel attached to the cabinet, wherein the shelf is held on the support panel, and wherein the weight sensor is sandwiched between the cabinet and the support panel for cantilevered engagement therewith.

20. The refrigerator appliance of claim 19, wherein the shelf assembly further comprises
- a slide bracket mounted to the support panel, and
- a storage drawer slidably received on the slide bracket.

* * * * *